United States Patent [19]

Schlossberg

[11] 4,103,255

[45] Jul. 25, 1978

[54] HIGH POWER, COMPACT WAVEGUIDE GAS LASER

[76] Inventor: Howard R. Schlossberg, 9 Turning Mill Rd., Lexington, Mass. 02173

[21] Appl. No.: 776,388

[22] Filed: Mar. 10, 1977

[51] Int. Cl.² .............................................. H01S 3/03
[52] U.S. Cl. ........................... 331/94.5 C; 331/94.5 G
[58] Field of Search .................. 331/94.5 G, 94.5 D, 331/94.5 C, 94.5 R; 350/96 WG, 96 LM

[56] References Cited

U.S. PATENT DOCUMENTS

| | | | |
|---|---|---|---|
| 3,404,349 | 10/1968 | Rigrod | 331/94.5 C |
| 3,535,017 | 10/1970 | Miller | 350/96 WG |

Primary Examiner—William L. Sikes
Assistant Examiner—Marcus S. Rasco
Attorney, Agent, or Firm—Joseph E. Rusz; Jacob N. Erlich

[57] ABSTRACT

A high power, compact waveguide gas laser having a housing located within a resonant cavity. The housing has a longitudinal chamber situated therein, the chamber being divided into a plurality of waveguides by a plurality of infrared transmitting partitions. During operation of the laser, the leakage of laser radiation between adjacent waveguides through the partitions causes the coupling of the phases of the waveguide modes thereby producing a laser output of high power.

10 Claims, 2 Drawing Figures

HIGH POWER, COMPACT WAVEGUIDE GAS LASER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to gas lasers, and, more particularly, to a waveguide $CO_2$ laser which is compact, lightweight and produces a high power output.

Since the development of the first working lasers, considerable time and effort has been expended in the search for lightweight, compact high output laser systems. The possible applications of such high power lasers are unlimited in the fields of communication, manufacturing and medicine. In particular in the fields of medicine and communication it is of utmost importance that the laser be lightweight and still produce high output. To date, the gas laser, and in particular, the $CO_2$ laser has been largely used in these fields.

Gas laser operation requires that a population inversion be established between upper energy levels and lower energy levels of the lasing medium. In the $CO_2$ laser (generally an electrically excited mixture of carbon dioxide, nitrogen and helium) laser operation may be achieved by the resonant transfer of energy, through collisions from a first gaseous substance, designated the "energizing substance" such as vibrationally excited molecular nitrogen ($N_2$), to a second substance designated the "lasing substance" such as carbon dioxide ($CO_2$). Nitrogen and $CO_2$ may be fully mixed together, such as in a fully mixed gaseous plasma, while the substances in this mixture are raised to respective specific energy levels, favorable to laser emission as a result of the electron collisions in an electronic plasma.

During this procedure it is necessary that the nitrogen have sufficient energy in its vibrational mode so as to impart a substantial amount of energy to $CO_2$ in the 001 state, which is commonly referred to as the upper laser level for $CO_2$ molecules. The very efficient energy transfer between the nitrogen and the carbon dioxide results from a near identity of the energy spacing of certain of the vibrational states of these two substances.

Thus, in the present state of the gas laser art, lasing (which is the coherent stimulated emission of quanta of light energy) of one substance results from that substance being brought to a high, nonequilibrium energy state as a result of collisions with an energizing gas excited to a vibrational energy level which closely matches an energy level of the lasing substance (i.e., the upper lasing level in $CO_2$). Simply stated, at least one $CO_2$ molecule which is present in a region of population inversion will spontaneously emit a photon with an energy equal to the difference between the upper laser energy level and the lower laser energy level for a $CO_2$ molecule. This is a quantum of light energy which is reflected back and forth in the resonant cavity. The photon will impinge on another $CO_2$ molecule and cause a rapid, stimulated emission of a second photon. This photon is also reflected back and forth in the resonant cavity, which brings about a continuing avalanche of stimulated photon emission, at the lasing wavelength. This sequence will occur nearly instantaneously so that lasing is established in say, nanoseconds. The useful laser output is derived by coupling light energy out of the oscillating and/or amplifying resonant cavity.

Within the gas laser the population inversion is achieved by "pumping" the higher energy vibrational states in the media through the action of an electric current (electric discharge).

Unfortunately, even though the gas laser produces a high output, there are many problems relating to its use, in particular, the laser itself fails to be as compact and lightweight as required. Since it is essential within satellites that a laser utilized for communications does not add to the overall weight of the satellite, much research in this field is still underway. Futhermore, in the field of medicine which requires hand-held, portable laser devices that are capable of providing precision and "bloodless" cutting, the basic gas laser still leaves much to be desired.

SUMMARY OF THE INVENTION

The instant invention provides a compact waveguide gas laser which produces high output power and thereby overcomes the problems set forth in detail hereinabove.

It is well known that the waveguiding of gas lasers allows us to extend operation of lasers to smaller diameter discharges without being limited by the higher optical losses that would attent simple free-space diffraction-limited wavepropagation in such tubes. Furthermore, within the waveguide lasers, compared to the larger diameter lasers, as the tube diameter is made smaller, the pressure increases; the tube current decreases; the tube voltage increases; the gain remains the same; the power output per unit length remains the same; and the efficiency remains the same. It is therefore seen that power per unit length is the proper quantity for scaling waveguide gas lasers.

The instant invention utilizes the concept of waveguiding gas lasers, and in particular, $CO_2$ waveguide lasers in order to produce a high laser output from an extremely lightweight and compact laser. The laser of this invention is made up of a resonant cavity in which is situated an elongated housing which defines an elongated chamber. The chamber is divided into a plurality of longitudinal waveguides by the utilization of partitions made of a good infrared transmitting material. A pair of electrodes and a gas inlet is connected to each waveguide through the housing in a conventional manner. The ends of the waveguide which in effect from the boundaries of the resonant cavity are sealed by a pair of highly reflective flat mirrors (one being substantially totally reflective and the other approximately 98% reflective).

In operation any suitable DC discharge, as in conventional waveguide lasers, is excited in each waveguide. During the lasing action some of the laser radiation in each waveguide leaks through the infrared transmitting partition into adjacent waveguides. This action has the effect of coupling the phases and changing the amplitude distribution of the waveguide modes. Equivalently, the plurality of waveguides together support one total mode. The nature of the mode depends upon the loss in the transmitting material. By use of the laser of this invention stable discharges can be sustained at the high pressure characteristic of the combination of the plurality of waveguides. That is, the laser of the instant invention coherently adds the plurality of waveguides laser outputs.

It is therefore an object of this invention to provide a waveguide gas laser which is capable of operating at higher than normal pressures over a large volume.

It is another object of this invention to provide a waveguide gas laser which provides higher laser power per unit volume than previously achievable.

It is still a further object of this invention to provide a waveguide gas laser of high output which is also lightweight and compact.

It is still another object of this invention to provide a waveguide laser which is economical to produce and which utilizes conventional currently available components that lend themselves to standard mass producing manufacturing techniques.

For a better understanding of the present invention together with other and further objects thereof, reference is now made to the following description taken in conjunction with the accompanying drawing and its scope will be pointed out in the appended claims.

DETAILED DESCRIPTION OF THE PREFERRED EMBODIMENT

Figure 1:
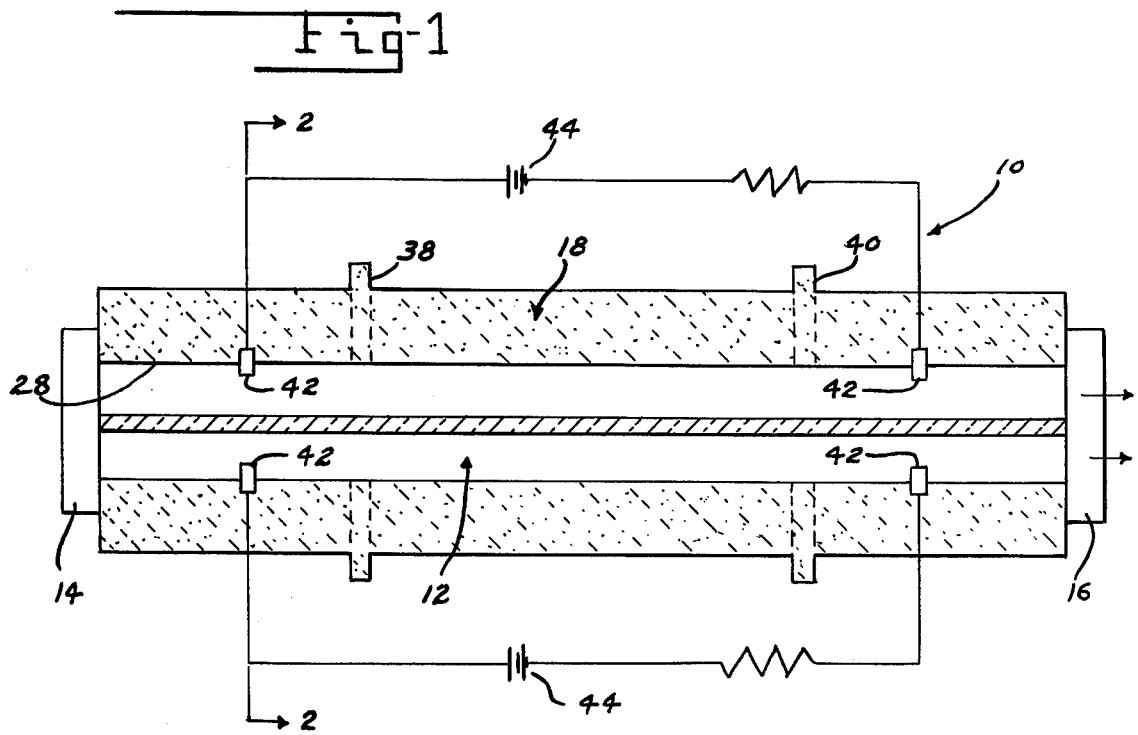
FIG. 1 is a schematic side elevational view of the waveguide gas laser of this invention, shown partly in cross section.

Reference is now made to FIG. 1 of the drawing which best shows the high power compact waveguide gas laser 10 of this invention. Laser 10 is made up of a resonant cavity defined by a pair of reflective surfaces 14 and 16 (or the equivalent) which allows the lasing action to take place therebetween in a conventional manner. Reflective surface 14 may take the form of a highly reflecting substantially totally reflective mirror while surface 16 takes the form of a highly reflective partially transmitting mirror, that is, approximately 98% reflective.

Figure 2:
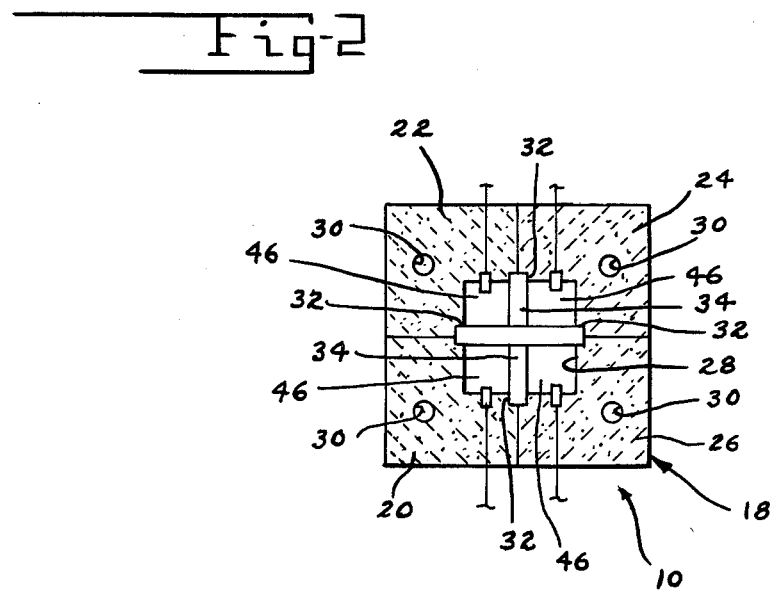
FIG. 2 is a schematic cross sectional view of the waveguide gas laser of this invention taken along lines 2—2 of FIG. 1.

Located within the resonant cavity is an elongated housing 18. Housing 18 is made of any suitable ceramic material such as aluminum oxide, beryllium oxide or boron nitride. The entire housing 18, for convenience, is generally formed or machined of four separate segments or elements 20, 22, 24 and 26 as best shown in FIG. 2 of the drawing. Segments 20, 22, 24 and 26 are generally of an L-shaped configuration so that in the assembled position a chamber 28 is formed in the central portion of housing 18 along the longitudinal axis thereof. In addition, a plurality of longitudinal openings or channels 30 are located within each element 20, 22, 24 and 26, respectively, to allow for a coolant to be supplied thereto in order to cool laser 10. In addition, within the interior of chamber 28 a plurality of slots 32 are formed in elements 20, 22, 24 and 26 which are utilized to secure in place a plurality of partitions 34 to be described in detail hereinbelow. The entire housing 18 and partitions 34 are secured together in any conventional manner such as by an adhesive or the like. Although housing 18 may take the form of a variety of sizes and shapes, optimum results are obtained when housing 18 has a length of approximately 15 centimeters with chamber 28 generally being of a square configuration, being approximately 3mm by 3mm throughout the length of housing 18 when housing 18 is in its assembled configuration. In addition to openings or channels 30 which run along the longitudinal axis of housing 18 parallel to chamber 28, housing 18 contains therein a plurality of inlets 38 and outlets 40 shown in FIG. 1 which permit the lasing medium such as a gas to be introduced within chamber 28. Furthermore, a plurality of conventional electrodes 42 are secured within housing 18 in order to provide a DC discharge to the lasing medium in order for the lasing action to take place. The discharge apparatus is conventional in nature and may be supplied from the same or separate power sources 44.

Referring once again to FIG. 2, located within chamber 28 and held in place by slots 32 are partitions 34 which divide elongated chamber 28 into a plurality of waveguides 46. Partitions 34 may be formed of a single piece or a plurality of pieces of good infrared transmitting material such as zinc selenide or cadmium telluride of less than 1mm thickness. In the case of a $CO_2$ laser, partitions 34 are generally infrared transmitting material at 10 $\mu$m. Although partitions 34 may be either formed of individual segments secured together or a single segment, the overall effect should be that the legs or partitions 34 are capable of dividing chamber 28 into a plurality of waveguides which extend the entire length of housing 18. The reflective surfaces 14 and 16 seal each end of waveguides 46, respectively, of chamber 28.

Although the embodiment shown in FIGS. 1 and 2 of the drawing disclose four such waveguides 46 within chamber 28 the instant invention is not limited to four waveguides but may be extended to any number of such waveguides 46 as long as a proper discharge can take place within the waveguide and the infrared transmitting partitions separate adjacent waveguides. For example, it may be possible to fabricate the entire many waveguide assembly out of infrared transmitting materials of zinc selenide formed by chemical vapor deposition on a suitable mandrel. For shorter wavelength lasers, for example CO, extruded sapphire assemblies could be used and this would be particularly attractive due to sapphires high thermal conductivity (especially at low temperatures).

In operation a DC discharge by way of electrodes 42, as in a conventional waveguide laser, is excited in each waveguide 46 from the same or separate power supplies 44. In the case of a $CO_2$ laser some 10.6$\mu$m laser radiation in each waveguide mode leaks through the infrared transmitting partitions 34 and into adjacent waveguides 46. Such action has the effect of coupling the phases and changing the amplitude of the waveguide modes. Equivalently, the plurality of waveguides together support a total mode. The nature of this mode depends upon the loss in the infrared transmitting material of partitions 34. As a result thereof, laser 10 of the instant invention can produce stable discharges which can be sustained at the high pressure characteristic of each waveguide 46, the power output, however, is characteristic of the plurality of waveguides 46 together. In other words, laser 10 coherently adds the four or plurality of waveguide laser outputs. This results in a laser 10 which can produce the high output of an extremely long laser without the requirement of the great length heretofore required. Such high power output lasers as defined by this invention can be built extremely lightweight and as compact as possible.

Although this invention has been described with reference to a particular embodiment it will be understood to those skilled in the art that this invention is also capable of a variety of alternate embodiments within the spirit and scope of the appended claims.

I claim:

1. A high power compact waveguide laser comprising a resonant cavity, an elongated housing located within said resonant cavity, a longitudinal chamber located within said housing and containing a lasing medium, means for dividing said longitudinal chamber into a plurality of longitudinal waveguides, said dividing means being transmissive to the emission wavelength of said lasing medium, means for admitting said lasing medium into said waveguides and means for causing a lasing action to take place within said lasing medium located within each of said waveguides whereby leakage of laser radiation between adjacent waveguides through said dividing means causes the coupling of the phases of the waveguide modes and thereby produces a laser output of high power.

2. A high power compact waveguide laser as defined in claim 1 wherein said lasing medium is a gas.

3. A high power compact waveguide laser as defined in claim 2 wherein said lasing medium emits in the infrared region and said dividing means is in the form of a plurality of infrared transmitting partitions.

4. A high power compact waveguide laser as defined in claim 3 wherein said housing is made of a ceramic material.

5. A high power compact waveguide laser as defined in claim 4 wherein said longitudinal chamber has a square cross section approximately 3mm by 3mm.

6. A high power compact waveguide laser as defined in claim 5 wherein said housing is approximately 15cm long.

7. A high power compact waveguide laser as defined in claim 6 wherein said chamber is divided into four waveguides.

8. A high power compact waveguide laser as defined in claim 7 wherein said resonant cavity is defined by a pair of highly reflective surfaces.

9. A high power compact waveguide laser as defined in claim 8 further comprising at least one longitudinal cooling channel within said housing.

10. A high power compact waveguide laser as defined in claim 9 wherein said gas is $CO_2$.

* * * * *